(12) United States Patent
Wilk et al.

(10) Patent No.: US 10,634,555 B2
(45) Date of Patent: Apr. 28, 2020

(54) PROTECTING A UV-TRANSMISSIVE WINDOW

(71) Applicant: Xenon Corporation, Wilmington, MA (US)

(72) Inventors: Stephen R. Wilk, Saugus, MA (US); Saad Ahmed, Wilmington, MA (US)

(73) Assignee: Xenon Corporation, Wilmington, MA (US)

(\*) Notice: Subject to any disclaimer, the term of this patent is extended or adjusted under 35 U.S.C. 154(b) by 0 days.

(21) Appl. No.: 16/388,281

(22) Filed: Apr. 18, 2019

(65) Prior Publication Data
US 2019/0323883 A1    Oct. 24, 2019

Related U.S. Application Data

(60) Provisional application No. 62/659,330, filed on Apr. 18, 2018.

(51) Int. Cl.
*G01J 1/42*    (2006.01)
*F21V 7/00*    (2006.01)
(Continued)

(52) U.S. Cl.
CPC ............ *G01J 1/429* (2013.01); *F21V 7/0016* (2013.01); *F21V 23/0457* (2013.01); *G01J 1/0238* (2013.01); *H01J 61/16* (2013.01)

(58) Field of Classification Search
CPC ...... G01J 1/429; G01J 1/0238; F21V 23/0457; F21V 7/0016; H01J 61/16
See application file for complete search history.

(56) References Cited

U.S. PATENT DOCUMENTS

| | | | |
|---|---|---|---|
| 4,701,613 A | 10/1987 | Watanabe et al. | |
| 4,972,258 A | 11/1990 | Wolf et al. | |

(Continued)

FOREIGN PATENT DOCUMENTS

| | | | |
|---|---|---|---|
| CN | 1908638 A | \* | 2/2007 |
| EP | 0493815 B1 | | 3/1996 |

OTHER PUBLICATIONS

John DiGeronimo, EIC 2800 Search Report, Aug. 19, 2019, Scientific and Technical Information Center (Year: 2019).\*

(Continued)

*Primary Examiner* — Raymond R Chai
(74) *Attorney, Agent, or Firm* — Wilmer Cutler Pickering Hale and Dorr LLP

(57) ABSTRACT

Systems and methods are disclosed for protecting a UV-transmissive window. The system includes a first light source for emitting UV energy. The system also includes a UV transmissive window having a planar dimension and a thickness direction perpendicular to the planar dimension, the window positioned so that UV energy from the UV light source passes through the thickness dimension of the window. The system further includes a second light source for introducing a beam of light transverse to the thickness dimension of the window, a detector for detecting light received from the second light source after the light passes through the thickness dimension, and a control system responsive to changes in the detected light received from the second light source and configured to transmit an alert when a change in the detected light exceeds a threshold.

15 Claims, 11 Drawing Sheets

(51) Int. Cl.
    *G01J 1/02*           (2006.01)
    *F21V 23/04*        (2006.01)
    *H01J 61/16*        (2006.01)

(56)              References Cited

U.S. PATENT DOCUMENTS

| | | |
|---|---|---|
| 5,359,681 A | 10/1994 | Jorgenson et al. |
| 5,363,463 A | 11/1994 | Kleinerman |
| 5,908,704 A | 6/1999 | Friedman et al. |
| 8,441,467 B2 | 5/2013 | Han |
| 2004/0222364 A1 | 11/2004 | Kenny et al. |
| 2009/0023229 A1* | 1/2009 | Matsushita ....... H01L 21/67115 438/7 |
| 2009/0115824 A1* | 5/2009 | Gold ................... B41J 2/17593 347/88 |
| 2011/0063626 A1 | 3/2011 | Takeda et al. |
| 2011/0146792 A1* | 6/2011 | Wu ....................... B32B 17/10 136/259 |
| 2012/0132618 A1 | 5/2012 | Baluja et al. |
| 2012/0229893 A1* | 9/2012 | Hebrink ................. G02B 1/04 359/359 |
| 2012/0307236 A1* | 12/2012 | Ortner ............... G01N 21/9505 356/239.3 |
| 2017/0290933 A1* | 10/2017 | Collins .................... A61L 2/10 |

OTHER PUBLICATIONS

International Search Report and Written Opinion dated Aug. 26, 2019, in the International Application No. PCT/US19/28166, 11 pages.

* cited by examiner

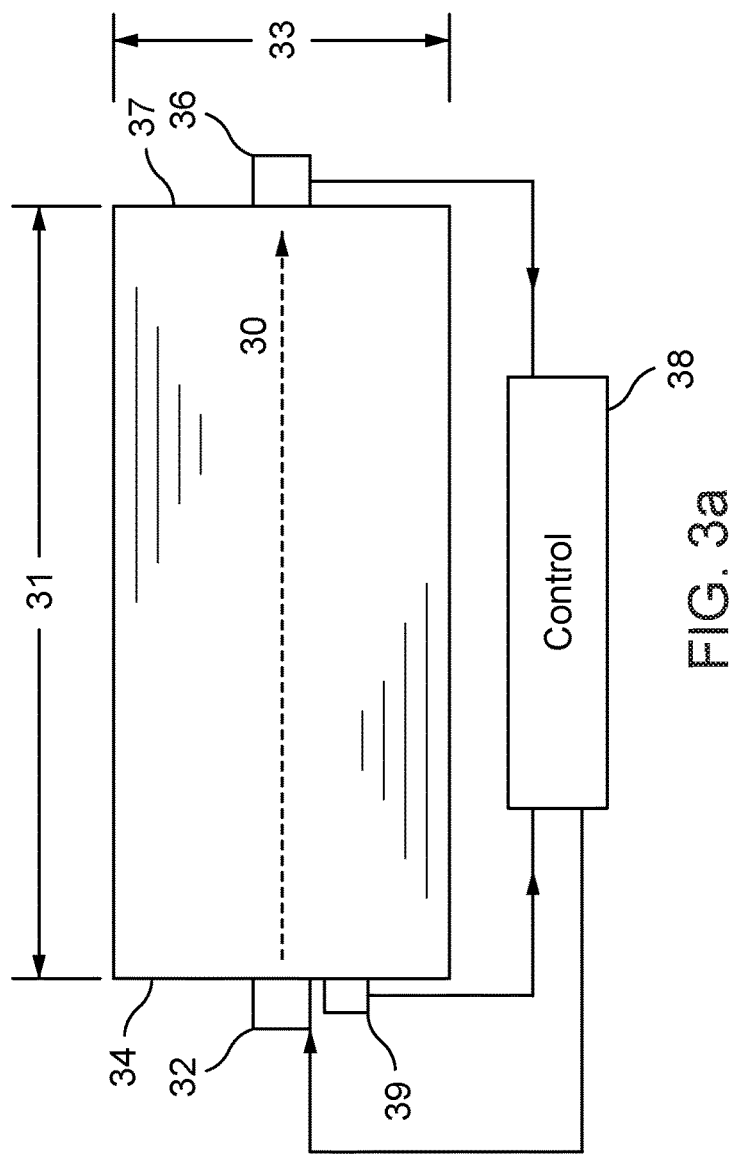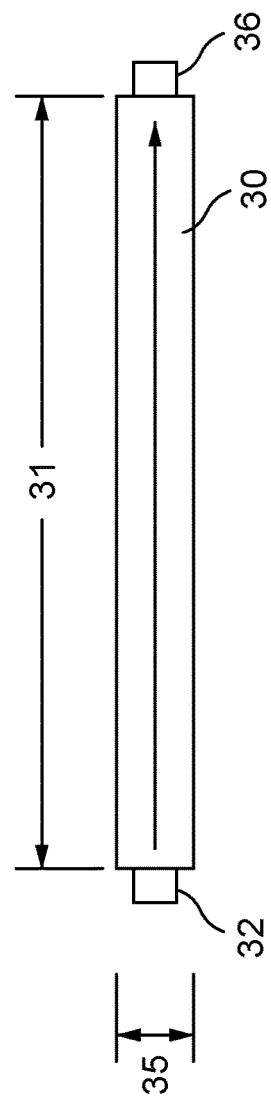
FIG. 3a
FIG. 3b

PROTECTING A UV-TRANSMISSIVE WINDOW

CROSS REFERENCE TO RELATED APPLICATIONS

This application claims priority to U.S. Provisional Application No. 62/659,330, filed Apr. 18, 2018, entitled "Protecting a UV-Transmissive Window," the contents of which are incorporated herein in their entirety.

TECHNICAL FIELD

The present disclosure relates generally to light systems, and in particular, to systems and methods for detecting changes in a UV-transmissive window.

BACKGROUND

In some systems for providing UV light to a target item, a UV lamp is housed in an envelope and emits UV light that is provided through a window to the target item. The window is typically made from fused silica, although it is often referred to as quartz. Unlike typical glass, the fused silica window is substantially transparent to UV energy at germicidal wavelengths on the order of 260-300 nm that are desirable for disinfection and sterilization.

In one type of system, a conveyor belt brings items to be radiated to a xenon flash system with one or more lamps, and the flash lamp(s) provide one or more flashes of broadband light to the items to be treated. The treatment can be used for different purposes, such as curing an adhesive, annealing, sintering, or disinfecting.

Other types of systems use a mercury lamp to provide continuous (not flashed) UV light that has pronounced peaks at certain wavelengths.

SUMMARY OF THE INVENTION

Systems and methods are disclosed herein for determining whether material anomalies exist within a substantially planar glass sheet. In some embodiments, the system includes an ultraviolet (UV) light system including a first light source for emitting UV energy; a UV transmissive window having a planar dimension and a thickness direction perpendicular to the planar dimension, the window positioned so that UV energy from the UV light source passes through the thickness dimension of the window; and a second light source for introducing a beam of light to the window along a direction transverse to the thickness dimension of the window. In some embodiments, the system includes a detector for detecting light received from the second light source after the light passes through the window along the thickness dimension and a control system responsive to changes in the detected light received from the second light source and configured to transmit an alert when a change in the detected light exceeds a threshold (which could be above or below a specified threshold amount). In some embodiments, the planar dimension includes a lengthwise dimension and a width dimension, and wherein the beam of light is introduced along the lengthwise direction. In some embodiments, the second light source comprises a plurality of light sources for providing a respective plurality of beams of light, and the detector includes a plurality of detectors respectively associated with the plurality of light sources for receiving the respective plurality of beams of light. In some embodiments, the beam of light comprises multiple beams. In some embodiments, the system includes a second detector for detecting the beam of light before the beam of light is introduced to the thickness dimension of the window, the second detector for providing a signal to the control system, the control system responsive to the first and second detectors for providing an alert.

In some embodiments, the system, in order to transmit an alert based on the detected changes, the control system is further configured to determine a first difference between a first detected change and a threshold value and transmit the alert based on the first difference being higher than a minimum difference value and lower than a maximum difference value. In other embodiments, the control system is further configured to turn off the light source when the first difference is higher than the maximum difference value indicating that the UV energy and the beam of light are provided at the same time. In some embodiments, the control system is configured to determine a second difference between a second detected change and the threshold value. In other embodiments, the control system is configured to turn on the light source when the second difference is lower than the maximum difference value. In some embodiments, the window comprises a substantially planar fused silica portion having first and second planar sides, and a first laminate layer of a different material on the first side of the fused silica portion. In some embodiments, the system includes a second laminate layer on the second side of the fused silica portion. In some embodiments, the laminate includes fluorinated ethylene propylene (FEP). In other embodiments, the laminate is bonded to the fused silica with one of a fluoropolymer epoxy and a polychlorotrifluoroethylene (PCTFE) in a gel form. In some embodiments, the window includes a reflective material positioned along at least portions of the thickness dimension to cause light from the beam of light to be contained within the window. In some embodiments, the reflective material comprises at least one of a reflective coating, a curved mirror, and a straight mirror. In other embodiments, the planar dimension includes a lengthwise dimension and a width dimension, and wherein the beam of light is introduced skewed relative to the lengthwise direction. In some embodiments, the alert automatically causes the first light source to stop emitting UV energy.

In some embodiments, the system includes an ultraviolet (UV) light source for emitting UV energy and a UV transmissive window having a planar dimension and a thickness direction perpendicular to the planar dimension, the window positioned so that UV energy from the UV light source passes through the thickness dimension of the window. In some embodiments, the window comprises multiple layers including a planar glass layer and a first laminate made of a different material from the planar glass layer on a first planar side of the glass layer. In some embodiments, the glass layer includes fused silica, and the laminate includes fluorinated ethylene propylene (FEP). In some embodiments, the laminate is bonded to the fused silica with one of (a) a fluoropolymer epoxy and (b) a polychlorotrifluoroethylene (PCTFE) in a gel form. In other embodiments, the window includes a second laminate on a second planar side opposite to the first planar side.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

FIGS. 3a and 3b are plan and side views, respectively, of a window within an embodiment of a crack detection system.

DETAILED DESCRIPTION

This description relates to a system and method for detecting a crack or break in a window used in processing equipment that allows an operator to replace the window before further damage results to the window, and therefore the items being treated using ultraviolet ("UV") energy. This description further describes a system that employs a plastic laminate that reduces the possibility that a window could break such that shards of the window material are mixed in with an item being processed. These systems and methods can be used separately or together in combination.

Plastic Laminate for Window

In a system where an overhead lamp provides UV light through a window to items below the window, it would be possible for the window to break, and for shards from the window to fall on the items being processed or treated. In some embodiments, to strengthen the window, and to reduce the risk of shards falling on the items, a plastic laminate is provided to a side of the window facing items to be treated, or the same or similar laminate can be provided to both sides of the window. Alternatively, the laminate material itself can be used as the window.

Many plastic materials would not be suitable for this purpose because they are not transparent to UV light. Embodiments should include a sufficiently transparent material that does not degrade or darken under repeated exposure to UV sources. A suitable material should also have good mechanical strength in thin layers.

For example, one material that can be used for a UV-transmissive laminate is a fluorinated ethylene propylene (FEP), which is a copolymer of hexafluoropropylene and tetrafluoroethylene. FEP is melt-processable using conventional injection molding and screw extrusion techniques.

In some embodiments, the laminate can be bonded to the fused silica with an adhesive. It is desirable for the adhesive to have some resilience, not shatter, and have similar optical properties to the laminate to reduce Fresnel losses as light passes over the barrier between the laminate, the adhesive, and the window. For example, one suitable material for the adhesive is a fluoropolymer epoxy. Another material suitable as an adhesive is polychlorotrifluoroethylene (PCTFE) in a gel form.

The system is described here in the context of a UV flash lamp system, such as systems provided by Xenon Corporation, Wilmington Mass., but could be used in a continuous light UV system, for example, with one or more mercury lamps. A UV system such as a flash lamp system has many uses including curing adhesives, annealing layers of material, sintering conductive electrical traces, or treating products to deactivate microorganisms.

Figure 1:
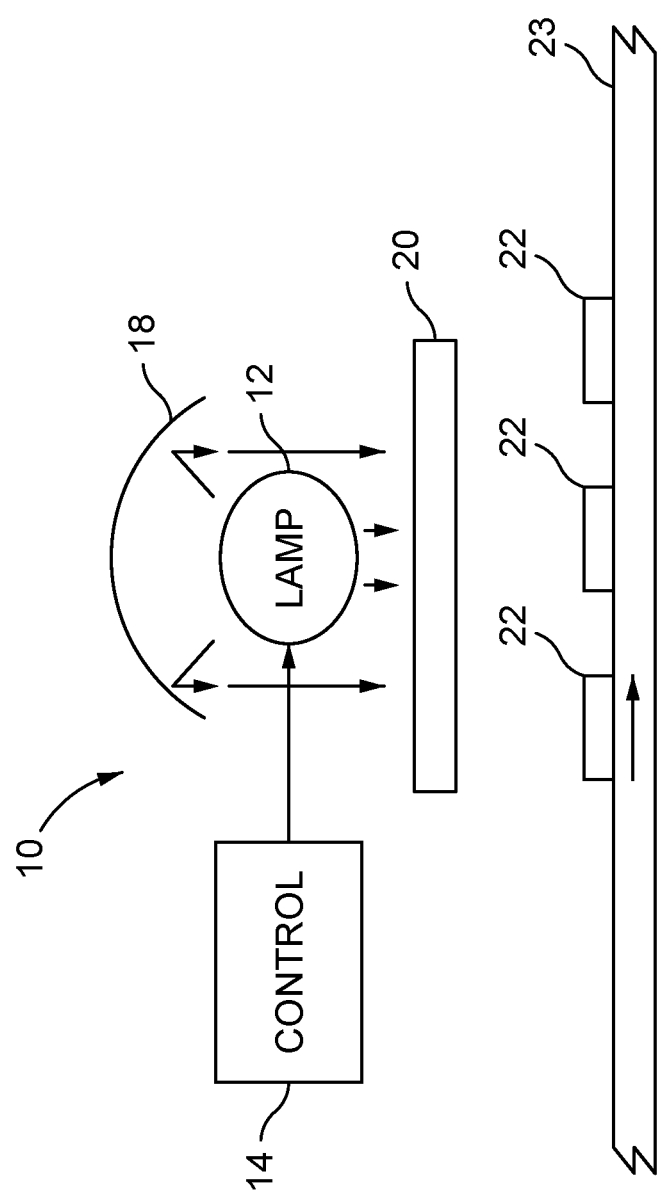
FIG. 1 is a system diagram of a lamp system for treating items using a flash lamp system with a UV-transmissive window.

FIG. 1 is a system diagram of a lamp system for treating items using a flash lamp system with a UV-transmissive window, according to some embodiments of the present disclosure. Referring to FIG. 1, a UV system 10 has a UV flash lamp 12 coupled to electronics and a control system 14 that control flashing. A reflector 18 is provided around the lamp to help direct the light in a desired direction toward a UV-transmissive window 20, the main portion of which is made of fused silica. The light emitted from UV flash lamp 12 is then provided to items 22 to be treated, which are on the opposite side of the window 20 from UV flash lamp 12. The items 22 can be provided on a conveyor belt 23 that can be stopped for treatment, or the conveyor belt 23 can move continuously while items 22 are treated. By way of example, items 22 may be optical memory disks with an adhesive that needs to be cured, or an item with a surface treatment that needs to be cured or annealed, or an item, such as food, to be disinfected (as UV light with wavelengths in the UV-C range are known to damage the DNA of bacteria, viruses, and protozoa that can contaminate products).

In some embodiments, window 20 is substantially planar, with a thickness dimension that is much less than the length and/or width dimension. Window 20 may be a substantially square-or rectangular-prism, or other polygonal-prism shapes.

UV flash lamp 12 of UV system 10 may be made of a single lamp or multiple lamps arranged in a row or in an array. Each lamp of lamp 12 can be circular, elongated, spiral, or some other desired shape. The process of causing the lamp to flash for a desired duration, with a desired pulse frequency, is generally known.

Figure 2:
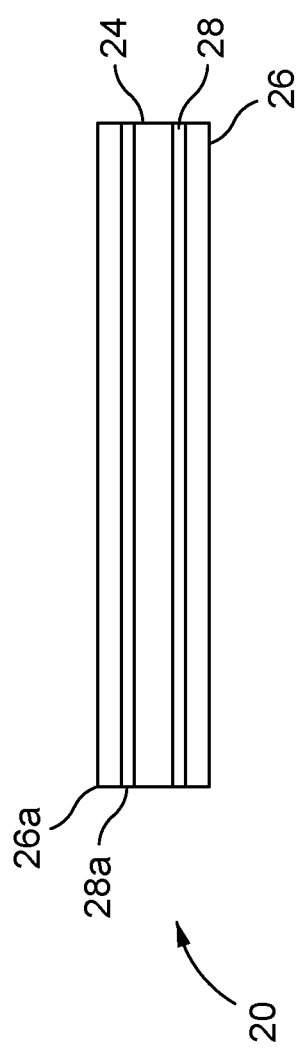
FIG. 2 is a side view of a UV-transmissive window with a laminate.

FIG. 2 is a side view of a UV-transmissive window with a laminate. FIG. 2 shows a window 20 that has a fused silica layer 24, and a laminate 26 of FEP on the lower, item-facing surface of the window. The laminate is coupled to fused silica layer 24 with an adhesive layer 28, that can be made, for example, of fluoropolymer epoxy or polychlorotrifluoroethylene (PCTFE) in a gel form.

In some embodiments, a second laminate layer 26a can be bonded to fused silica layer 24 with a second adhesive layer 28a on the upper side of the window 20 facing UV flash lamp 12. Second laminate 26a may provide more strength to window 20 but would produce more reflective Fresnel losses that occur when light passes through materials with different refraction indices such as the laminate 26, adhesive 28, and fused silica glass 24.

With laminate 26 (and second laminate layer 26a), if the fused silica layer 24 of the window were to crack, the laminate 26 would help hold the pieces of the window 20 together as a single unit and reduce the risk of pieces of the window 20 falling on items 22 and onto conveyor belt 23.

In another embodiment, the laminate 26 itself can be used to form the window 20, without fused silica window 24. The window 20 made only of laminate 26 may be held with a holding device (not shown) to be substantially taut but could allow some transverse movement of window 20 to avoid unnecessary stresses.

The devices and methods described herein thus include the combination of a substantially planar fused silica window with a substantially UV-transmissive laminate that does not materially degrade under repeated UV exposure. In one embodiment, the laminate can be made of FEP. The laminate can be bonded to the fused silica with a fluoropolymer epoxy adhesive, or PCTFE, or another suitable material.

The devices and methods described here also include a process of forming a window that include the combination of a substantially planar fused silica window with a UV-transmissive laminate. More particularly, forming the laminate with FEP. The process can include bonding the laminate with a fluoropolymer epoxy adhesive, or PCTFE.

The devices and methods disclosed here also include providing a laminate on one or both sides of the window. Further, the devices and methods include providing a window made of a sheet of FEP, and using that window in a flash UV system. Still further, the devices and methods include a UV light system, flash or continuous, that includes a UV transmissive window as described above.

Systems and methods are provided for detecting when a crack or break appears in a window. If a crack is detected, the window can be replaced before the crack becomes a more complete break, or portions of the window become delaminated or dislodged from the window, thereby reducing the possibility that a window could break in a way that shards fall onto an item being processed.

The UV flash lamp system is similar to those described above. The window can have a plastic laminate, e.g., made of FEP, on one or both sides of the window. The window may also be a UV-transmissive window (e.g., made of fused silica) without any plastic laminate.

In one embodiment of the disclosed system, a light source (e.g., a light beam) is introduced into the thickness dimension of the window (i.e., substantially parallel to the length-width plane) such that a parameter of the light is detected by a detector that is also at an end of the window. The parameter of the light may include the intensity of the light source, the wavelength of the light source, or other parameters indicating a lack of true light transmittal through the window. A control system receives data indicating changes in the light at the detector, and such changes are used to infer that a crack or break has occurred in the window. The control system can generate an alert (e.g., set off an alarm), which can shut off the UV lamp and the conveyor automatically, after which an operator of the flash lamp system may examine the window and replace it before the window breaks completely.

FIGS. 3a and 3b show a plan view and a side view of a crack detection system, according to some embodiments of the present disclosure. A window 30 has a length 31, width 33, and a thickness dimension 35. In some embodiments, the window can be square to elongated, and the thickness dimension 35 is much less than the length 31 and/or width 33, for example, a thickness dimension less than 1 cm. For purposes of explanation, it is assumed that the length 31 is larger than the width 33, and that the length 31 runs from left to right on the page. However, length 31 and width 33 could be reversed.

In some embodiments, a light source 32 (e.g., from a laser or laser diode), is directed into the window 30 such that the output of light source 32 enters through the thickness dimension 35 of the window at a near end 34. Near end 34 can be polished to reduce scattering of light output from light source 32 and ensure maximum utilization of light output from light source 32. The light beam can be introduced directly by coupling the light source to near end 34 of the window 30 or the light source can include a prism or other optical components (not shown) to direct a beam introduced at an angle away from the longitudinal axis of window 30 along length 31 such that when output light source 32 passes through such optical components, the light source 32 is incident upon window 30 through the thickness dimension 35 along length 31 as described above. In some embodiments, a first detector 36 is positioned at a far end 37 of the window 30. Detector 36 is coupled to a control system 38 that provides an alert in case of a significant change in the parameters of detected light output from light source 32 (e.g., relative to a threshold of a total amount of energy detected) or a change in the parameters of detected light output over a unit time.

A second detector 39 can be used to detect the output of the light source 32, and the processing system can compare the light parameter as introduced at the near end 34 of window 30 with the light parameter detected by first detector 36 at the far end 37 of window 30. Second detector 39 may be placed close to the source and reflected from a beam splitter, or the second detector 39 can detect a reflection at the light source input at the near end 34 of window 30. Second detector 39 may account for changes in the light source 34 output, and thereby reduce the risk of a false positive if the light output changes. In some embodiments, second detector 39 may be a component of light source 32 such that light source 32 and second detector 39 comprise a single unit.

Control system 38 may monitor an output from light source 32 and compare it to a threshold measurement or to an amount of change of measured output from light source 32. For example, measured parameters from the output from light source 32 may include the intensity, wavelength, frequency, lux, candela, or watts, among others. Control system 38 may also compare the output from light source 32 with the parameter measured at detector 36 (e.g., a difference or a ratio). Controller system 38 may also monitor changes and variations in output from light source 32 as measured by detector 36 over a unit time. In any of these embodiments, a change in the parameter measured from the output from light source 32 that exceeds a predetermined threshold level (that can be constant or adapted over time by an operator) may cause the control system 38 to set off an alert, indicating to an operator of failures in the system's operation. The alert indicates to the system operator that window 30 needs inspecting, and the operator can replace the window 30 if cracks, nicks, or other anomalies are present. The alert may be a notification, a computer error message, a shutdown of the system's operation, or an audial alarm, among others. The process and method by which the controller system 38 detects anomalies in window 30 is described in more detail below with respect to FIGS. 8-11.

Figure 4:
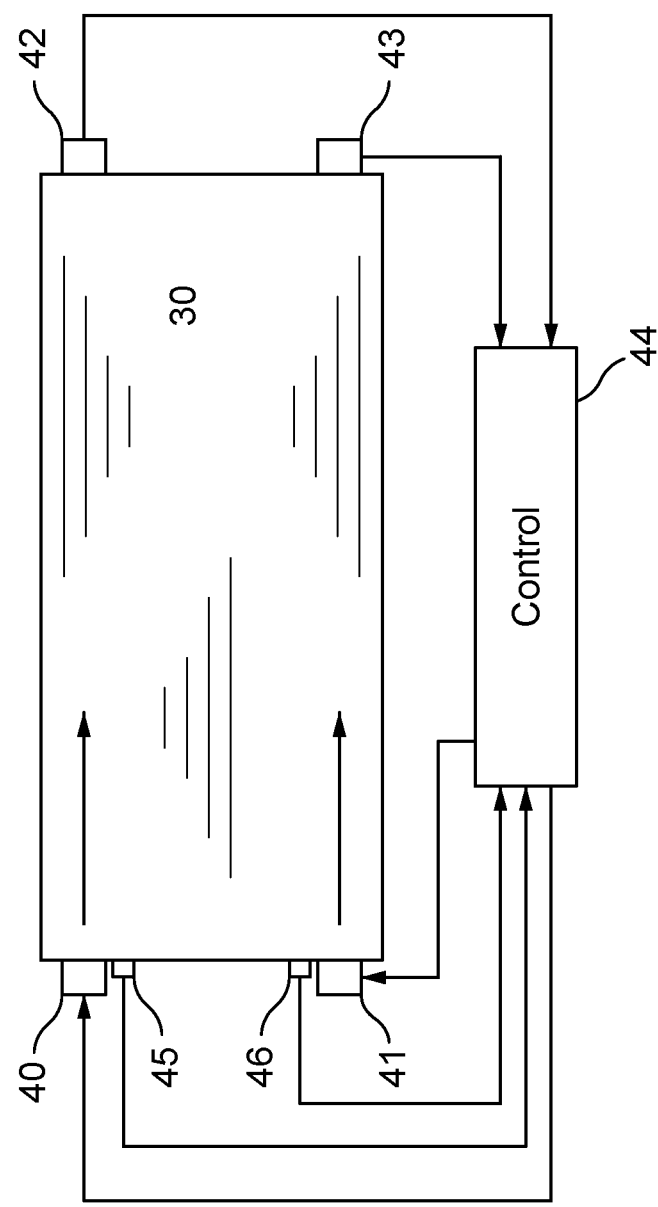
FIG. 4 is a plan view of a window with the crack detection system including two separate light sources and two separate detectors.

FIG. 4 shows a plan view of the crack detection system, according to an embodiment of the present disclosure. FIG. 4 shows two substantially similar light sources 40 and 41 that provide light beams to respective first detectors 42 and 43, which are coupled to a control system 44. As described in FIG. 3a, respective second light detectors 45 and 46 can be used to detect the light source 32 input to a near end of window 30. As an alternative to using two separate light sources, a single light source may be used, with mirrors and other suitable components (not shown) to create multiple beams, e.g., two parallel beams. In some embodiments, additional beams and detectors could be employed to provide further detection coverage of substantially all of the window 30 volume.

Figure 5:
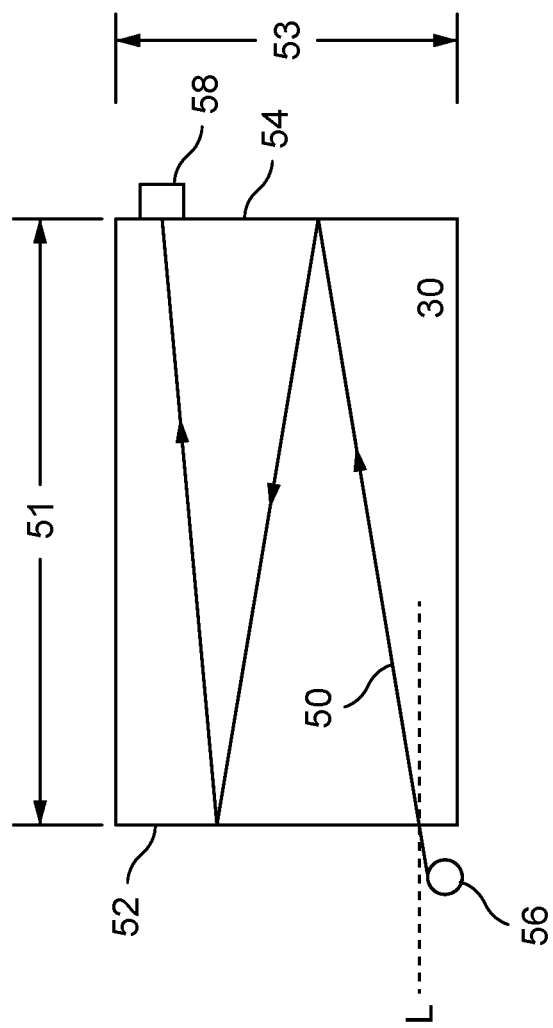
FIG. 5 is a plan view of a window with the crack detection system including a single light source traveling through the window at an angle.

The embodiments of FIGS. 3a, 3b, and 4 assume that the light path is parallel to the length direction, although it need not be. FIG. 5 shows a plan view of the window in the crack detection system including a single light source traveling through the window at an angle, according to some embodiments of the present disclosure. Referring to FIG. 5, in one embodiment a light beam 50 can be incident upon window 30 at an angle relative to a length direction 51 and/or a width direction 53 of window 30. In such an embodiment, a near end 52 and a far end 54 of the window 30 are polished and have a reflective coating (not shown), such as, for example, an aluminum coating. The reflective coating may be provided such that the light is totally internally reflected within window 30. The light beam 50 is introduced with a light source 56 at the near end 52 and reflected along a path substantially within window 30 until it reaches a detector 58. Detector 58 may be placed on either near end 52 or far end 54 of window 30 to receive light beam 50. As discussed above with regard to FIGS. 3a, 3b, and 4, a second detector could be employed at the light source 56, multiple beams and detectors could be used, and a control system would detect changes and provide an alert as needed. The angle can be set to provide a desired number of reflections before the light beam 50 reaches the detector 58. A larger number of reflections within window 30 provides for more coverage of substantially all of window 30 by light beam 50 such that anomalies occurring at any point on or within window 30 may be detected by the disclosed system.

Figure 6:
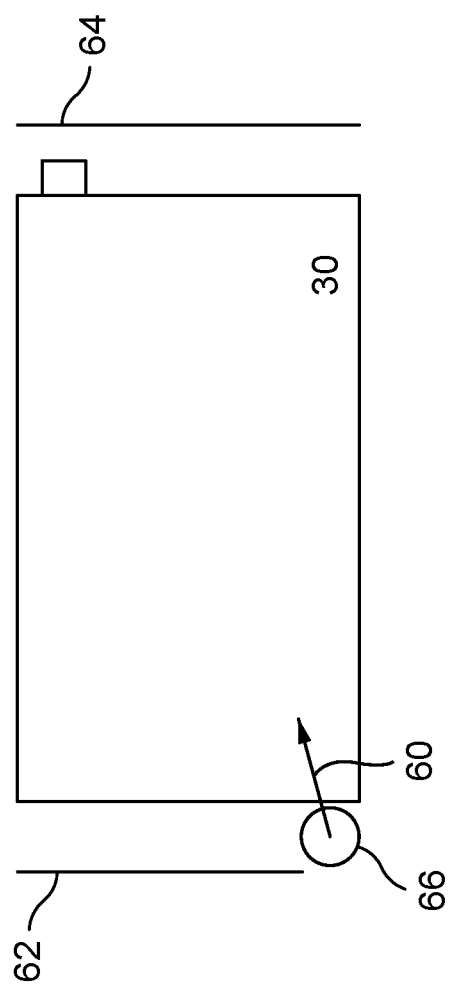
FIG. 6 is a plan view of a window with the crack detection system including a single light source and single detector with a mirrored surface adjacent to the window.

FIG. 6 shows a plan view of a window with the crack detection system including a single light source and single detector with a mirrored surface adjacent to the window, according to some embodiments of the present disclosure. Referring to FIG. 6, the system shown is substantially the same as FIG. 5, except that rather than using a reflective material at the near end and far end of window 30, mirrors 62 and 64 are placed at either or both ends and detached from the window 30. FIG. 6 shows a light source 66 producing a light beam 60 into window 30 that may reflect off of mirrors 62 and 64. One benefit of this embodiment includes better control of reflecting light source 66 and simplifies the window 30 and its manufacture, but introduces Fresnel losses as the light beam 60 exits and enters window 30 In other embodiments, mirrors 62 and 64 may be curved mirrors employed to re-focus the light beam 60 and reduce scattering and beam spread. This approach would function like a known Herriott cell.

Figure 7:
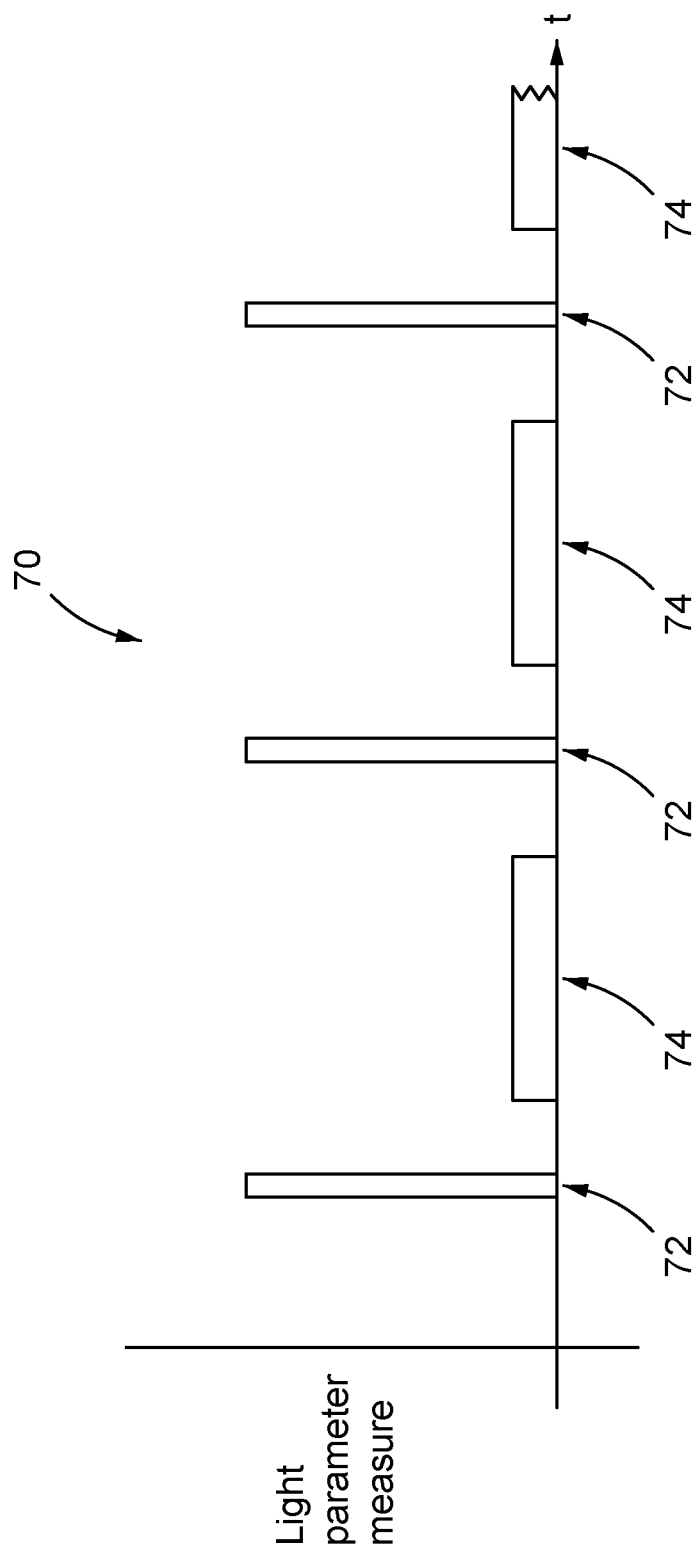
FIG. 7 is a timing diagram representing an interaction of UV flashes and the use of a light beam for crack detection.

FIG. 7 depicts an estimated graphical representation of the disclosed controller system 38 reading light source output to determine light intensity, according to some embodiments of the present disclosure. The crack detection system can be used with a flash lamp system as described above. In any of the above-described embodiments of a crack detection system, the crack detection light source can be turned on and off as desired. The vertical axis of graph 70 represents a light parameter measurement based in data collected by a detector. The horizontal axis of graph 70 represents a unit time. Graph 70 depicts one example of an output from the disclosed flash lamp system wherein a UV energy source (e.g., a UV lamp) flashes 3 times per second, with a pulse width of 10 msec, represented as pulses 72. The flash lamp system and the crack detection system can be under common control, as described below with regard to FIG. 9, so that the light beam for the crack detection system is introduced at intervals 74 between the pulses 72 of the UV energy source. In this way, some embodiments allow the crack detection device to operate passively without interrupting the operation of the flash lamp system, providing benefits that include decreasing system downtime for maintenance and bacterial checks, among others. In some embodiments, the UV energy source is communicatively coupled to the crack detection system such that the UV energy source will be periodically turned off when the crack detection system is operating.

Alternatively, the system can recognize sudden changes due to flashing as opposed to the appearance of a crack or break, and not provide an alert in those cases. For example, in some embodiments the control system can be programmed to recognize sharp changes in light due to periodic flashing or can use learning techniques to recognize that a change in light detection is caused by an operational flash of the UV energy source rather than by an anomalous crack in the window.

Figure 8:
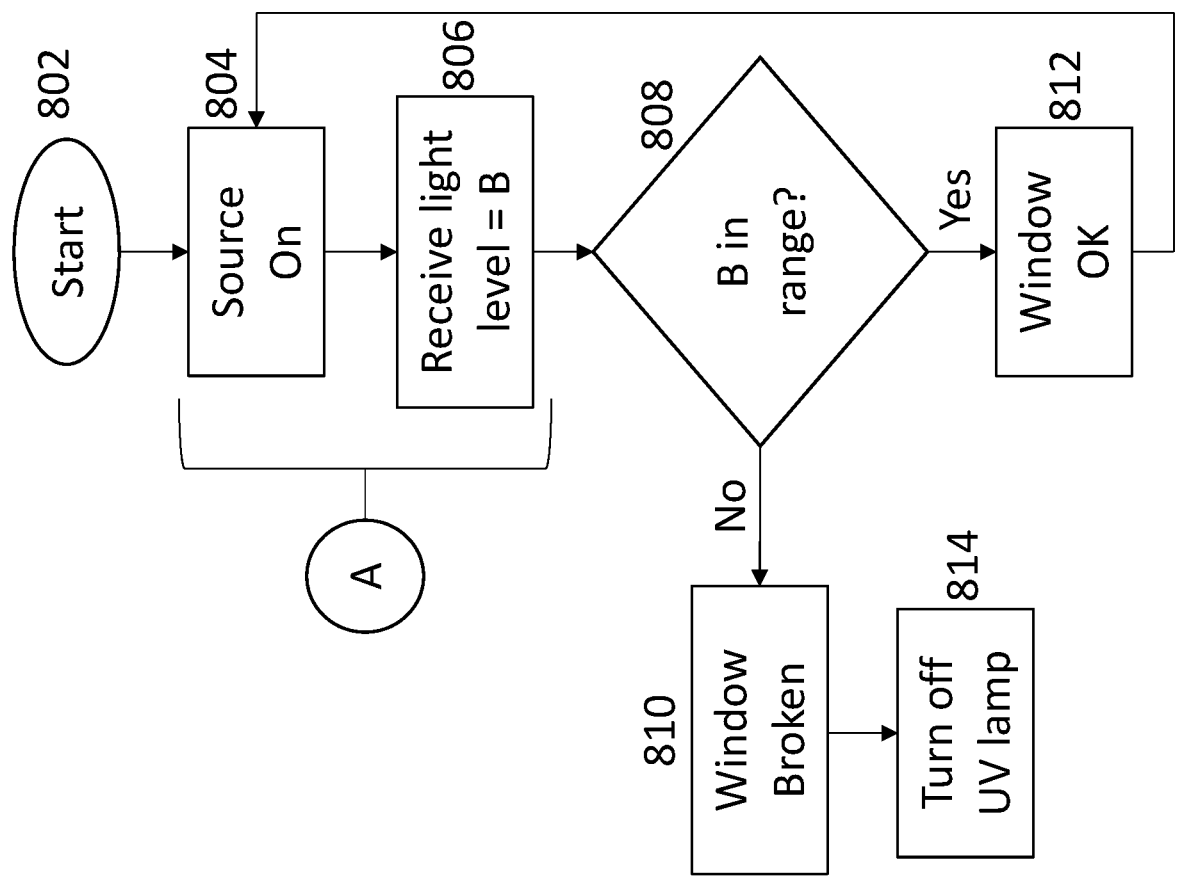
FIG. 8 is a flow chart illustrating a controller sequence for a crack detection system to determine if a window has a crack.

FIG. 8 shows a flow chart of the method by which the crack detection system determines if anomalous material defects are present in the window, according to some embodiments of the present disclosure. Descriptions of the disclosed method carried out by a controller are representative of the sequence carried out by a controller system, such as the controller system 38 of FIG. 3 and the controller system 44 of FIG. 4. At step 802, the crack detection system initiates the determination sequence. At step 804, the crack detection system turns the light source on such that the light source output enters the window as described above with regard to FIGS. 3-6. At step 806, the crack detection system receives a light parameter level from a detector after the light source output passes through a portion of the window. This light parameter level is notated as light level "B" for purposes of comparison to determine whether an anomaly exists on the surface, or within, the window. At step 808, the crack detection system determines whether the light parameter level "B" is within a specified determination range. The determination range may be a threshold value as set by an operator or may be set by the controller after receiving information about items being processed using the flash lamp system or other operational information. For purposes of explanation, steps 804 and 806 collectively make up process sequence A of the crack detection system method carried out by the controller.

At step 808, if the light parameter level "B" is not within the specified determination range, then the crack detection system will alert the operator that the window is broken at step 810. The alert may be a notification, a computer error message, or an audial alert, among others. In some embodiments, when the crack detection system alerts the operator at step 810, the controller may simultaneously turn off the flash lamp system, at step 814, and require an operator's confirmation that the window is not broken before continuing operation. If the light parameter level "B" is within the specified determination range at step 808, the crack detection system confirms that the window is "OK" at step 812, indicating that the window does not have material anomalies that require inspection. Upon determining that the window does not have anomalies that require operator inspection, the crack detection system returns to step 804 to begin the detection sequence again.

Figure 9:
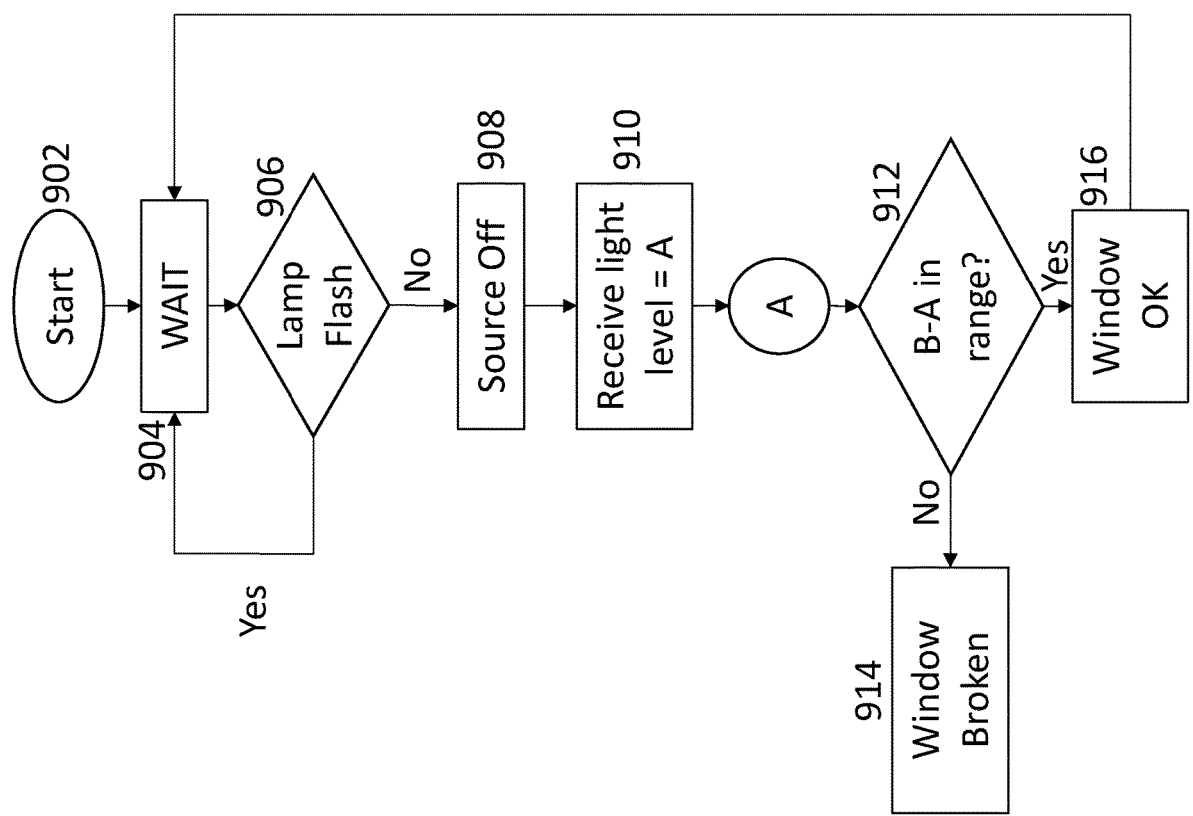
FIG. 9 is a flow chart illustrating a process for a crack detection system to determine if a window has a crack that accounts for light from a flash lamp system.

FIG. 9 shows a flow chart of the method by which the controller system determines if anomalous material defects are present in the window accounting for light inputs from flash lamp treatments, according to some embodiments of the present disclosure. At step 902, the crack detection system initiates the determination sequence. At step 904, the crack detection system waits for a specified count value of time, as set by an operator. In one embodiment, the count value between the initiated crack detection system sequence and the following step is zero such that the operation is simultaneous. At step 906, the crack detection system flashes the flash lamp system providing UV energy to an item being processed. If the flash lamp system is programmed to execute multiple flashes, the crack detection system will return to step 904 and account for additional occurrences by which UV energy is provided to an item being processed. If the flash lamp system is not executing multiple flashes, or has completed the sequence of multiple flashes, crack detection system turns off the source (e.g. a flash lamp) at step 908. At step 910, the crack detection system determines a light level "A" within the window. In some embodiments, steps 906, 908, and 910 may occur simultaneously such that the crack detection system determination of light level A is the light level produced by the lamp flash at step 906. In other embodiments, steps 906, 908, and 910 may occur sequentially such that the crack detection system determination of light level A is the ambient light level around the window of the crack detection system.

Following step 910, the crack detection system carries out process sequence A (steps 804 and 806) of the crack detection system method as described above with regard to FIG. 8. Following process sequence A, at step 912, the crack detection system determines a difference between light level "A" received at step 910 and light level "B" received during process sequence A to calculate a difference between the two values. In this way, the crack detection system may determine a change in the light levels passing through the window to determine if material anomalies exist. For example, a difference in light intensity may indicate a crack or fracture within the window that disperses light through the window. If the difference between light level "A" and light level "B" is not within a specified range (e.g., a threshold measurement), then at step 914, the crack detection system provides an alert to an operator that the window is broken. Similar to the description above with regard to FIG. 8, after determining that the window is broken, crack detection system may turn off the flash lamp system such that an operator may inspect the window for defects. At step 912, if the difference between light level "A" and light level "B" is within the specified range, then the crack detection system may determine that the window is free from anomalous material defects, at step 916. Upon determining the window is "OK" the crack detection system may return to step 904 to initiate the crack detection system sequence in conjunction with further treatment of items using the flash lamp system.

Figure 10:
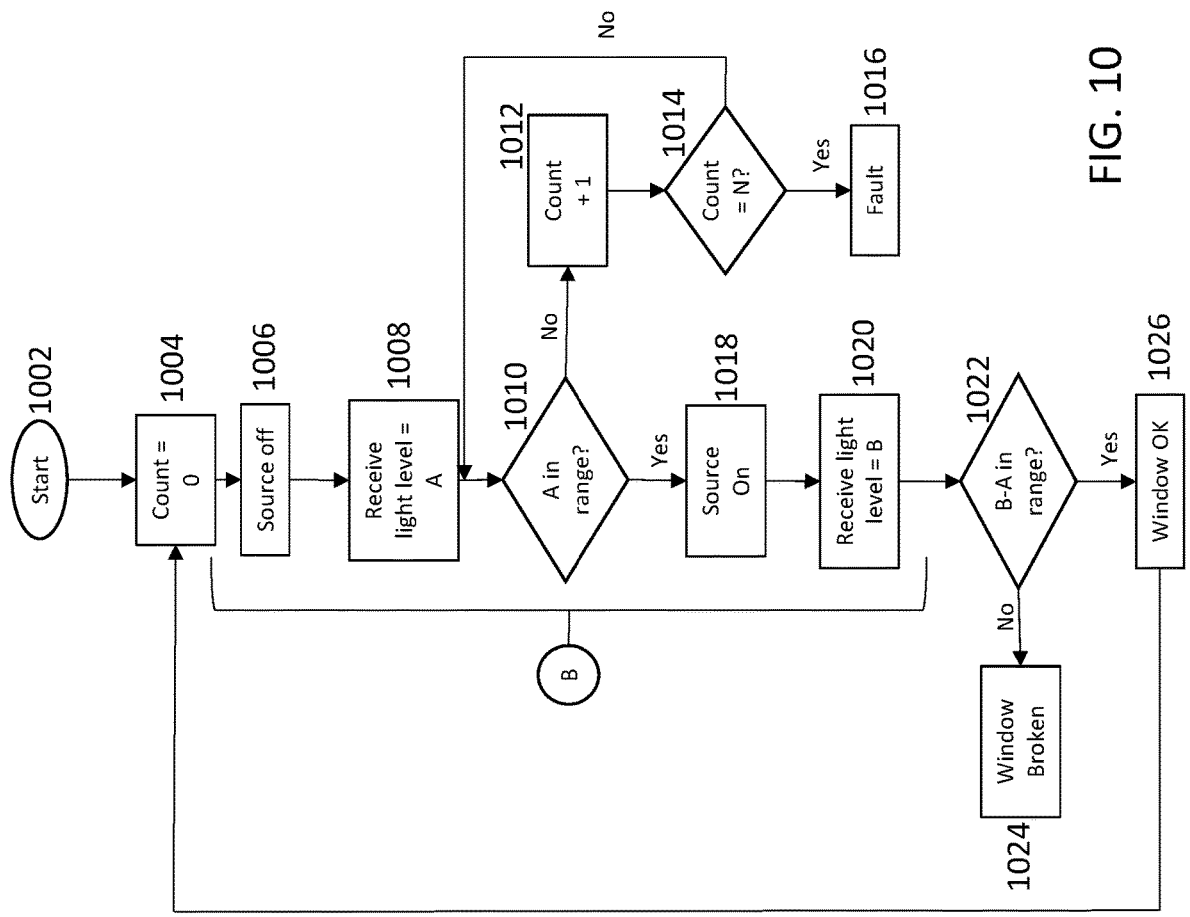
FIG. 10 is a flow chart illustrating a process for a crack detection system to determine if a window has a crack that accounts for ambient light.

FIG. 10 shows a flow chart of the method by which the controller system determines if anomalous material defects are present in the window that accounts for ambient light, according to some embodiments of the present disclosure. At step 1002, the crack detection system initiates the determination sequence. At step 1004, the crack detection system waits for a specified count value of time, as set by an operator. In one embodiment, the count value between the initiated crack detection system sequence and the following step is zero such that the operation is simultaneous. At step 1006, crack detection system turns off the source to provide the system with an accurate prior light level. At step 1008, the crack detection system determines a light level "A" within the window. In some embodiments, steps 1006 and 1008 may occur simultaneously such that the crack detection system determination of light level A is the light level produced by the lamp flash at step 906. In other embodiments, steps 1006 and 1008 may occur sequentially such that the crack detection system determination of light level A is the ambient light level around the window of the crack detection system. Ambient light may be incident upon the system from other sources such as, for example, an external laser source or room light directed into the window or detector.

At step 1010, the crack detection system determines if light level "A" is within a range as set by an operator or determined by the controller using information about the items being processed. If light level "A" is not in range, then the crack detection system waits a set count time, at step 1012, before determining light level "A" again to determine whether the light level "A" is within the range. At step 1014, the crack detection system will determine that light level "A" is not within range for a number of times "N" as set by an operator. When light level "A" has failed to fall within the specified range for those "N" times, the crack detection system will produce a fault message, at step 1016, that alerts the operator that the crack detection system is not operating properly. The fault message allows an operator to determine if the crack detection system is operating properly before introducing a light beam into the window, avoiding false-positive readings of material anomalies within the window due to faulty preliminary determinations of light level "A."

If light level "A" is within the specified range at step 1010, the crack detection system will then turn the light source on at step 1018, such that the light source output enters the window as described above with regard to FIGS. 3-6. At step 1020, the crack detection system receives a light parameter level from a detector after the light source output passes through a portion of the window. This light parameter level is notated as light level "B" for comparison to determine whether an anomaly exists on the surface, or within, the window. For purposes of explanation, steps 1006-1020 collectively make up process sequence B of the crack detection system method carried out by the controller.

At step 1022, the crack detection system determines a difference between light level "A" received at step 1008 and light level "B" received at step 1020 to calculate a difference between the two values. The light level "A" received at step 1008 provides an accurate baseline measurement of light level such that the crack detection system may accurately measure the difference. For example, the reading of light level "A" may be a chopper stabilized reading that accounts for the difference between measured light levels and take into account any electrical drift as part of the system components. In this way, the crack detection system may determine a change in the light levels passing through the window to determine if material anomalies exist. For example, a difference in light intensity may indicate a crack or fracture within the window that disperses light through the window. If the difference between light level "A" and light level "B" is not within a specified range (e.g., a threshold measurement), then at step 1024, the crack detection system provides an alert to an operator that the window is broken. Similar to the description above with regard to FIGS. 8 and 9, after determining that the window is broken, crack detection system may turn off the flash lamp system such that an operator may inspect the window for defects. At step 1022, if the difference between light level "A" and light level "B" is within the specified range, then the crack detection system may determine that the window is free from anomalous material defects, at step 1026. Upon determining the window is "OK" the crack detection system may return to step 1004 to initiate the crack detection system sequence in conjunction with further treatment of items using the flash lamp system.

Figure 11:
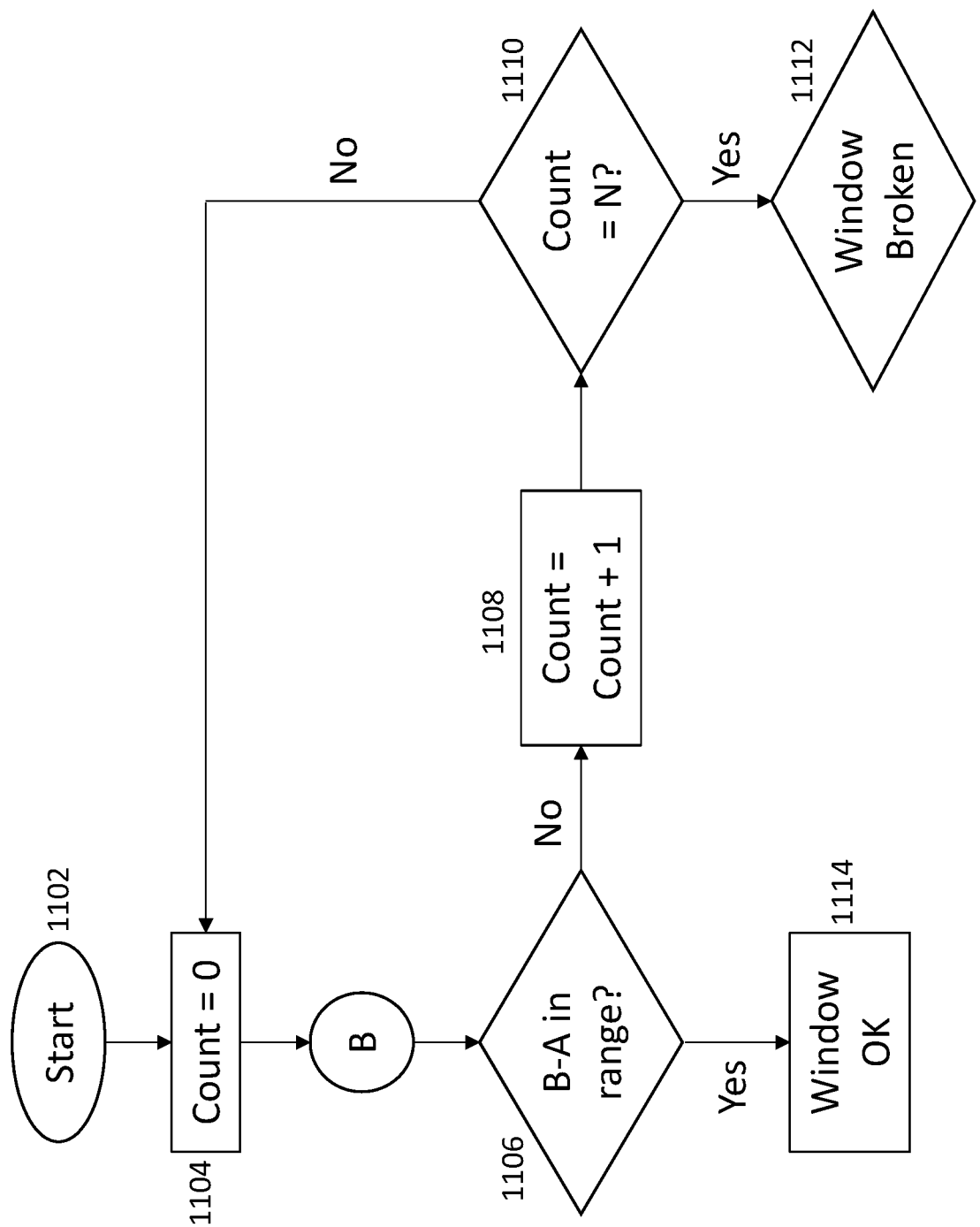
FIG. 11 is a flow chart illustrating a process for a crack detection system to determine if a window has a crack with a false positive accounting loop.

FIG. 11 shows a flow chart of the method by which the controller system determines if anomalous material defects are present in the window with a false positive accounting loop, according to some embodiments of the present disclosure. At step 1102, the crack detection system initiates the determination sequence. At step 1104, the crack detection system waits for a specified count value of time, as set by an operator. In one embodiment, the count value between the initiated crack detection system sequence and the following step is zero such that the operation is simultaneous. Following step 1104, the crack detection system proceeds to process sequence B described in FIG. 10. At step 1022, the crack detection system determines a difference between light levels "A" and "B" received in process sequence B to calculate a difference between the two values. In this way, the crack detection system may determine a change in the light levels passing through the window to determine if material anomalies exist. For example, a difference in light intensity may indicate a crack or fracture within the window that disperses light through the window. At step 1108, if the difference between light level "A" and light level "B" is not within a specified range (e.g., a threshold measurement), then the crack detection system waits for an additional count before determining the difference between light levels "A" and "B" again. At step 1110, the crack detection system will determine that difference between light levels "A" and "B" is not within range for a number of times "N" as set by an operator. When the difference between light levels "A" and "B" has failed to fall within the specified range for those "N" times, the crack detection system will produce an alert to an operator, at step 1112, indicating that the window is broken. Similar to the description above with regard to FIGS. 8, 9, and 10, after determining that the window is broken, crack detection system may turn off the flash lamp system such that an operator may inspect the window for defects. At step 1106, if the difference in light level "A" and "B" is within the specified range, then the crack detection system may determine that the window is free from anomalous material defects. Upon determining the window is "OK" the crack detection system may return to step 1104 to initiate the crack detection system sequence in conjunction with further treatment of items using the flash lamp system.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A system comprising: an ultraviolet (UV) light system including
a first light source for emitting UV energy;
a UV transmissive window having a planar dimension and a thickness dimension in a direction perpendicular to the planar dimension, the UV transmissive window positioned so that UV energy from the UV light source passes through the thickness dimension of the UV transmissive window;
a second light source for introducing a beam of light to the UV transmissive window along a direction transverse to the thickness dimension of the UV transmissive window;
a detector for detecting light received from the second light source after the light passes through the UV transmissive window along the thickness dimension; and
a control system responsive to changes in the detected light received from the second light source and configured to transmit an alert when a change in the detected light exceeds a threshold,
wherein the second light source comprises a plurality of light sources for providing a respective plurality of beams of light, and the detector includes a plurality of detectors respectively associated with the plurality of light sources for receiving the respective plurality of beams of light.

2. The system of claim 1, wherein the planar dimension includes a lengthwise dimension and a width dimension, and wherein the beam of light is introduced along the lengthwise direction.

3. The system of claim 1, wherein the beam of light comprises multiple beams.

4. The system of claim 1, further comprising a second detector for detecting the beam of light before the beam of light is introduced to the thickness dimension of the UV transmissive window, the second detector for providing a signal to the control system, the control system responsive to the first and second detectors for providing the alert.

5. The system of claim 1, wherein to transmit the alert based on the detected changes, the control system is further configured to:
determine a first difference between a first detected change and the threshold value; and
transmit the alert based on the first difference being higher than a minimum difference value and lower than a maximum difference value.

6. The system of claim 5, wherein the control system is further configured to turn off the light source when the first difference is higher than the maximum difference value indicating that the UV energy and the beam of light are provided at the same time.

7. The system of claim 6, wherein the control system is further configured to: determine a second difference between a second detected change and the threshold value; and turn on the light source when the second difference is lower than the maximum difference value.

8. The system of claim 1, wherein the UV transmissive window comprises a substantially planar fused silica portion having first and second planar sides, and a first laminate layer of a different material on the first planar side of the fused silica portion.

9. The system of claim 8, further comprising a second laminate layer on the second planar side of the fused silica portion.

10. The system of claim 8, wherein the laminate layer includes fluorinated ethylene propylene (FEP).

11. The system of claim 10, wherein the laminate layer is bonded to the fused silica with one of a fluoropolymer epoxy and a polychlorotrifluoroethylene (PCTFE) in a gel form.

12. The system of claim 1, wherein the UV transmissive window includes a reflective material positioned along at least portions of the thickness dimension to cause light from the beam of light to be contained within the UV transmissive window.

13. The system of claim 12, wherein the reflective material comprises at least one of:
a reflective coating;
a curved mirror; and
a straight mirror.

14. The system of claim 1, wherein the planar dimension includes a lengthwise dimension and a width dimension, and wherein the beam of light is introduced skewed relative to the lengthwise direction.

15. The system of claim 1, wherein the alert automatically causes the first light source to stop emitting UV energy.

* * * * *